May 9, 1933. A. Y. DODGE 1,908,410
BRAKE
Filed May 22, 1930
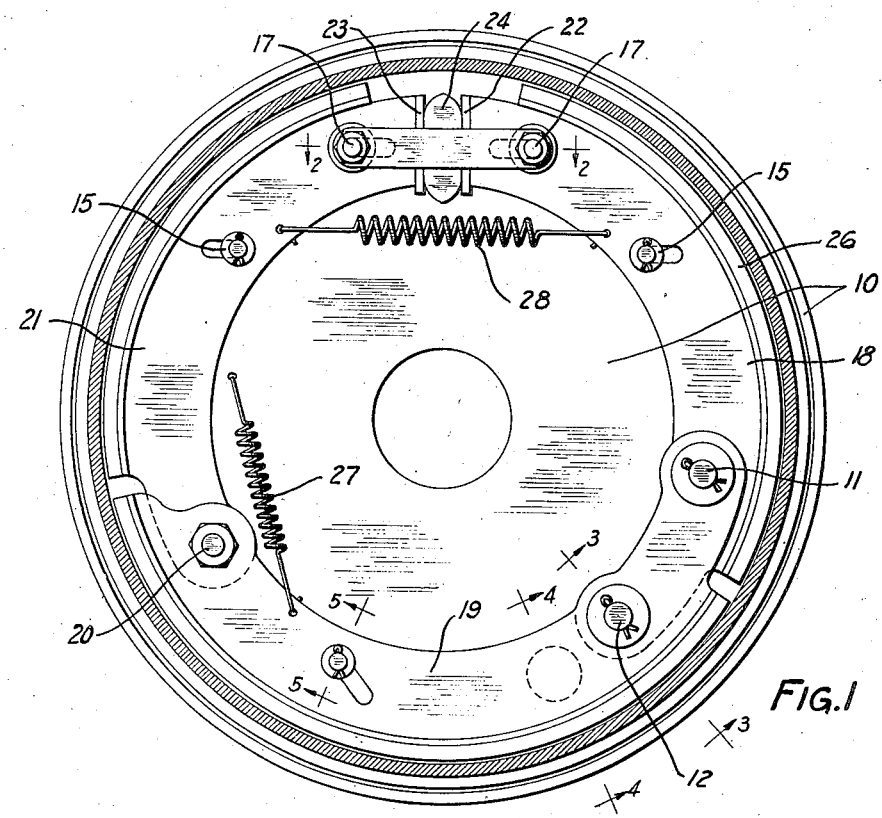
FIG.1
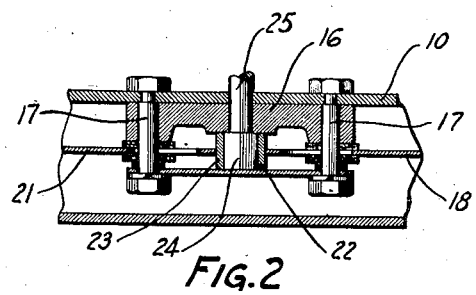
FIG.2
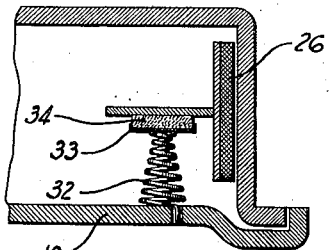
FIG.4
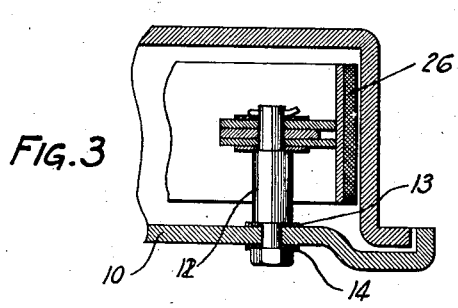
FIG.3
FIG.5
INVENTOR
ADIEL Y. DODGE
BY M. W. McConkey
ATTORNEY Patented May 9, 1933

1,908,410

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed May 22, 1930. Serial No. 454,585.

This invention relates to brakes and more particularly to vibration dampers therefor.

It has been found that the audible vibration of a brake is frequently due to vibrations generated by the brake shoe when in frictional engagement with the brake drum and that these audible vibrations are transmitted to the backing plate through the anchor bolts and other supporting means for the shoes. It is, therefore, apparent that a means for checking or dampening the vibration in brake shoes is highly desirable and would prove of great advantage in the art.

An object of the invention is to provide means for checking or damping the vibrations caused in a brake shoe through its frictional engagement with a brake drum.

Another object of the invention is to provide means for imposing pressure between the brake shoe and the backing plate of the brake.

Another object of the invention is to provide a cushioned pressure means between the brake shoe and the backing plate of the brake.

A further object of the invention is to provide a spring pressed cushion member interposed between the brake shoes and the backing plate of the brake.

A further object of the invention is to provide a spring pressed means between the web of the shoe and the backing plate of a brake.

Yet a further object of the invention is to provide a brake having a plurality of shoes with supports or steady rests having springs wound thereon between the backing plate and the webs of the shoes with asbestos or other vibration absorbing means interposed between the spring and the web.

A still further object of the invention is to provide a vibration damper of this character which is positive in action, highly efficient in operation and yet of marked simplicity as a whole and in respect to each of its component parts, so that its manufacture may be economically facilitated, both as respect to parts and their assembly.

Other objects of the invention will appear from the following description taken in connection with the drawing, which forms a part of this specification, and in which:

Figure 1 is a vertical sectional view of a brake illustrating the invention as applied;

Figure 2 is an enlarged sectional view substantially on line 2—2, Figure 1;

Figure 3 is an enlarged sectional view substantially on line 3—3, Figure 1;

Figure 4 is a sectional view substantially on line 4—4, Figure 1; and

Figure 5 is a sectional view substantially on line 5—5, Figure 1.

Referring to the drawing for more specific details of the invention, 10 represents a backing plate which may be secured to an axle housing or to a spindle. Positioned on the backing plate is a secondary shoe anchor 11 and an auxiliary shoe anchor 12. These anchors are suitably insulated from the backing plate as by paper washers 13 and 14. The backing plate also has positioned thereon suitable steady rests 15 and a reinforcing plate 16. As shown, the reinforcing plate is suitably secured to the backing plate as by studs 17 and the studs also function as steady rests.

Positioned for oscillation on the anchor bolt 12 is an auxiliary shoe 18 and positioned for oscillation on the anchor bolt 11 is a secondary shoe 19. The secondary shoe has connected thereto by a pin 20 a primary shoe 21. The auxiliary shoe 18 and the primary shoe 20 have on the free ends thereof shoulders 22 and 23 between which is mounted a cam 24 operated by a shaft 25, journaled in the reinforcing plate 16. The shoes are provided with the conventional brake lining as indicated at 26 and are connected to suitable springs 27 and 28 for returning the shoes to the off position.

Positioned on the steady rests 15 are helical springs 29. As shown, these springs are wound on the steady rests, so that one end thereof engages the backing plate 10 and the other end bears against the web 30 of the brake shoe with an asbestos washer 31 interposed. It is, of course, understood that other vibration dampening washers may be employed in lieu of the asbestos washers.

Suitably positioned on the backing plate and secured thereto in any desirable manner, is a helical spring 32 preferably a volute spring having secured to one end thereof a cup member 33, in which is positioned a felt washer 34, held against the web of the shoe by the tension of the spring.

These spring pressed members tend to check or damp vibrations set up in the brake shoe through their frictional engagement with the brake drum, before the vibrations have reached the period that they produce audible vibrations, which are highly objectionable and annoying.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim is new and desire to secure by Letters Patent is:

1. A brake comprising a backing plate, a support on the plate, a brake shoe positioned on the support, a spring on the plate and a sound deadening member between the plate and the shoe.

2. A brake comprising a backing plate, a plurality of shoes positioned on the plate, a resilient member on the plate, and a sound deadening member between the plate and the shoes.

3. A brake comprising a backing plate, a plurality of shoes positioned on the plate and a cushion member on the plate, and a sound deadening member between the cushion member and shoes.

4. A brake comprising a backing plate, a plurality of shoes positioned on the plate each having a rim and a web, means for actuating the shoes and means interposed between the web of one of the shoes and the backing plate for checking vibrations in the shoes.

5. A brake comprising a backing plate, a support on the backing plate, a brake shoe on the support, a spring on the backing plate and a cushion member between the spring and shoe.

6. A brake comprising a backing plate, a plurality of shoes movably mounted on the plate, means for moving the shoes, steady rests for the shoes and means interposed between the shoes and the backing plate including a helical spring and a cushion for dampening vibrations in the shoe.

7. A brake comprising a backing plate, a brake drum associated therewith, a plurality of shoes on the backing plate, means for operating the shoes to engage the drum, means for returning the shoes in the off position and means intermediate the shoes and the backing plate for dampening vibrations including a volute spring and a cushion member bearing against the web of the shoes.

8. A brake comprising a supporting member, a member adjacent the supporting member capable of audible vibration in the operation of the brake, a sound-deadening member, and resilient means carried by the supporting member pressing the sound-deadening member against the second mentioned member.

9. A brake comprising a supporting member, a vibratory friction member capable of audible vibration in the operation of the brake, a non-metallic sound-deadening member, and a resilient member carried by the supporting member urging the sound-deadening member into compressive engagement with the vibratory member.

In testimony whereof, I have hereunto signed my name.

ADIEL Y. DODGE.

CERTIFICATE OF CORRECTION.

Patent No. 1,908,410.                                                      May 9, 1933.

ADIEL Y. DODGE.

It is hereby certified that error appears in the printed specification of the above numbered patent requiring correction as follows: Page 2, line 49, claim 5, before "spring" insert the word "volute"; and that the said Letters Patent should be read with this correction therein that the same may conform to the record of the case in the Patent Office.

Signed and sealed this 8th day of August, A. D. 1933.

(Seal)

M. J. Moore.
                                  Acting Commissioner of Patents.